Sept. 30, 1958 J. E. DAVIS 2,854,505

TELEVISION RECEIVER COLOR COMPARATOR

Filed Jan. 24, 1955

INVENTOR.
JOSEPH E. DAVIS
BY
Mason, Kolehmainen, Rathburn & Wyss
ATTORNEYS.

United States Patent Office 2,854,505

Patented Sept. 30, 1958

2,854,505

TELEVISION RECEIVER COLOR COMPARATOR

Joseph E. Davis, Buffalo, N. Y., assignor to Sylvania Electric Products, Inc., a corporation of Massachusetts Application January 24, 1955, Serial No. 483,490

5 Claims. (Cl. 178—5.4)

The present invention relates to television receivers, more particularly to television receivers which are adapted to produce an image in simulation of its natural colors in response to a received signal, and the invention has for an object the provision of a new and reliable color reference source which may be readily and economically incorporated into a competitive type color television receiver so as to facilitate the rapid and accurate adjustment thereof.

In order to enable the adjustment of color television receivers so that the image reproduced on the screen thereof corresponds in every detail, including color, to the transmitted image, a test pattern of vertical bars of standard colors is sometimes transmitted before the color television program begins. The test pattern presently transmitted consists of seven vertical bars, the colors of which are respectively white, yellow, cyan, green, magenta, red and blue. If the color television receiver is properly adjusted the colors of the reproduced test pattern will have the same hue and saturation as the color bars of the transmitted test pattern and the following color television program will be faithfully reproduced in its natural colors. On the other hand, if the color television receiver is improperly adjusted, which situation may arise for any number of reasons including the common habit of television set owners of turning the control knobs of the set to see what effect they have on the picture, the colors of the reproduced test pattern will not have the correct hue and saturation. Furthermore, it has been found that the average person who owns and operates a color television receiver cannot readily perceive when his receiver is out of adjustment because he has to rely entirely on his memory as to what hue and saturation adjustments are required to reproduce the standard colors of the transmitted test pattern. Accordingly, if the average person attempts to adjust the controls of the receiver to obtain the correct hue and saturation of, for example, the red color bar of the test pattern, he usually ends up with a reproduced color which is even further removed from the standard red of the test pattern.

Another object of the present invention is, therefore, to provide in a color television receiver a source of standard reference color bars for comparison with the color bars of the reproduced test pattern so as to permit an accurate adjustment of the controls of the receiver for color reception.

A further object of the present invention is to provide such a color source in a simple and economical manner so as not to increase appreciably the manufacturing cost of a color television receiver.

A still further object of the present invention is to provide a reliable and yet inexpensive means for providing at least a single reference color at the front of a television receiver for use in making the various adjustments which affect the colors reproduced on the image screen.

Briefly, in accordance with one aspect of the present invention there is provided a plurality of light filter elements respectively having light transmission characteristics corresponding to each of the colors contained in the standard color bar test pattern, which filters are contiguously arranged behind a hinged panel at the front of the receiver cabinet near the image screen. A light source is provided within the receiver cabinet and behind the filters so as to provide an illuminated reference color bar pattern at the front of the receiver which closely simulates the standard colors of the transmitted test pattern. In accordance with a further aspect of the invention, a plurality of monochromatic, gray filters having densities corresponding to the blackness level of each of the bars in the standard color bar test pattern are respectively arranged below each of the color filters. In utilizing the standard calibration source of the present invention, the chroma control is adjusted to zero whereby no colors are reproduced on the image screen of the receiver, and the brightness and contrast controls are adjusted so that the vertical bar pattern in the receiver screen approximates the monochromatic pattern of the standard source. The chroma and color subcarrier phase controls of the receiver are then adjusted so as to match the colors of the bar pattern on the image screen with that of the polychromatic pattern of the standard source.

In accordance with another aspect of the present invention, a channel selector switch of the type having an illuminated channel number indicator portion is provided with a single color filter for viewing of the selected channel number and to make available a single standard color for comparison with one of the bars of the reproduced color bar test pattern to facilitate the proper adjustment of the chroma and phase controls of the color television receiver.

The invention, both as to its organization and method of operation, together with further objects and advantages thereof, will best be understood by reference to the following detailed description taken in connection with the accompanying drawings, in which.

Figures 1, 2, 3, 4, 5:
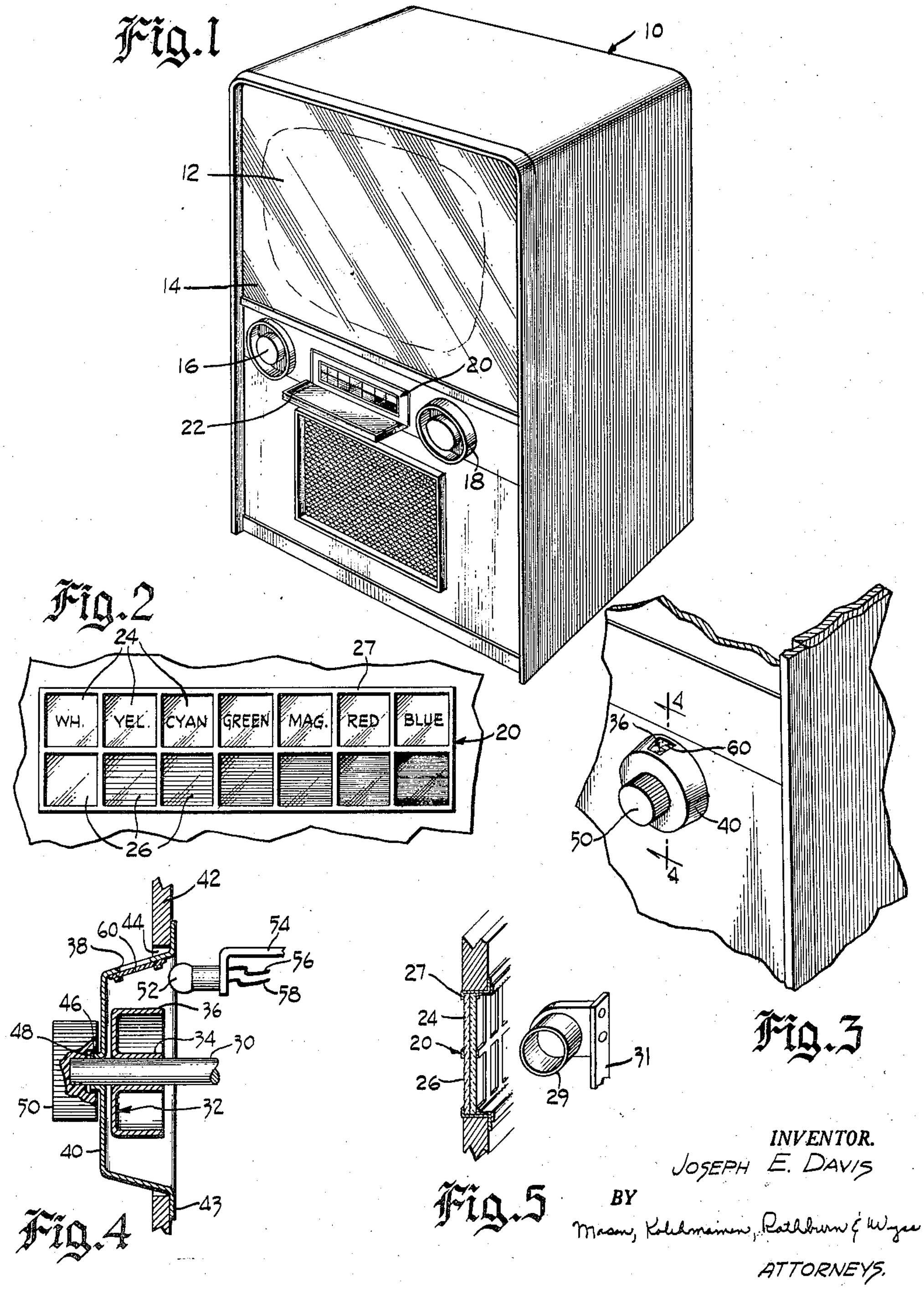
Fig. 1 is a perspective view of a color television receiver in which the color reference source of the present invention is provided behind a hinged cover at the approximate center of the front of the receiver cabinet.
Fig. 2 is an enlarged view of the filter apparatus utilized in the embodiment of Fig. 1.
Fig. 3 is a fragmentary perspective view of the front portion of a color television receiver cabinet illustrating another embodiment of the present invention wherein single reference color source is provided in connection with an illuminated channel selector switch.
Fig. 4 is a sectional view of the combination color reference source and channel selector switch of Fig. 3 taken along the line 4—4 thereof.
Fig. 5 is a fragmentary perspective view showing a lamp for illuminating the standard reference source of Fig. 1.

Referring now to the drawing and particularly to Fig. 1 thereof, there is shown a color television receiver cabinet 10 having an image screen 12 provided behind a transparent window 14 for viewing of the reproduced image. A pair of control knobs 16 and 18 are provided beneath the image screen 12 on opposite sides of the front panel of the receiver cabinet 10 and a color calibration unit 20 to be more fully described hereinafter is provided intermediate the control knobs 16 and 18 at approximately the center of the receiver cabinet 10 and directly beneath the viewing screen 12. A hinged panel member 22 is provided for covering the unit 20 during normal viewing of the reproduced color television image on the screen 12.

Referring to Fig. 2, wherein is shown a front elevational view of the color calibration unit 20, the unit 20 includes a plurality of contiguously arranged color filters 24 which are positioned above a row of contiguously arranged monochromatic filters 26. A multiple frame member 27 having a plurality of substantially square apertures is provided for masking the abutting portions of the individual filters 24 and 26 for facilitating an attractive mounting thereof at the front of the receiver cabinet 10. The color filters 24 cooperate so as to provide a grouping of color elements which is a substantial counterpart of the televised standard color bar pattern, and the monochromatic filters 26 cooperate so as to provide a grouping of elements of differing degrees of blackness which is a counterpart of the desired reproduced image of the televised standard color bar pattern in the absence of chroma signals. The color filters 24 thus respectively pass the colors, white, yellow, cyan, green, magneta, red and blue and the monochromatic or gray filters 26 are progressively darker from left to right ranging from one hundred percent light transmission at the left to eleven percent light transmission at the extreme right. The filters 24 and 26 may be of the conventional type wherein a layer of gelatin having the desired light transmission characteristics is sandwiched between a pair of transparent plates, or they may be of any other type providing they have a light transmission characteristic which is relatively stable throughout long periods of use.

Having the various components of the standard color calibration unit 20 in mind, a better understanding of the present invention may be obtained from a consideration of the way in which this reference source is utilized in adjusting a color television receiver. With the receiver tuned to a channel on which the standard color bar test pattern is being televised, the color components of the picture are first eliminated by setting the chroma control adjustment of the receiver to zero. The brightness and contrast controls of the receiver are then adjusted until the degree of blackness of the bars on the image screen corresponds to the degree of blackness of the monochromatic filters 26. When the brightness and contrast controls have been properly adjusted, the chroma detector circuits of the receiver are then energized by adjustment of the chroma control knob to produce a plurality of color bars on the image screen 12. The phase control is then adjusted until the hue of the reproduced color bars most nearly matches the hue of the colors in the standard source. The chroma control is then finally adjusted until the saturation of each of the bars in the reproduced pattern approximates that of the filters 24.

Since the colors in the image reproduced on the image screen 12 are not appreciably affected by the incident light impinging thereon, it is desirable to illuminate the filters 24 and 26 from a relatively standard source of illumination so that the reference unit 20 is also independent of ambient light. Therefore, in Fig. 5, there is illustrated apparatus whereby a relatively constant source of illumination is provided to effect at the front of the receiver 10 a source of reference color bars. In the arrangement of Fig. 5 there is provided a fluorescent lamp 29 supported on a bracket 31 which may conveniently be secured to the receiver chassis (not shown). The lamp 29 is disposed such that a portion of the light emitted thereby passes through the filters 24 and 26 to provide a plurality of reference hues and densities at the front of the receiver for comparison with the image reproduced on the viewing screen 12.

When a filter window of the type that is illuminated from the rear is thus employed, the window or filter surface is provided with a low reflection coefficient such that the ambient light in the room in which the television receiver 10 is located has little effect upon the colors emitted by the standard source 20. It would, of course, be desirable to provide a window having a reflection coefficient substantially equal to the reflection coefficient of the image viewing screen 12 and window 14; this, however, is expensive and unnecessary since the average viewer is unable to distinguish variations in color to such an extent that he can detect changes in the color source 20 due to changes in ambient lighting.

In order to provide a source of relatively constant illumination for the filters 24 and 26, the fluorescent lamp 29 is connected between points of relatively constant voltage level in the receiver circuit. For example, the voltage regulator of the receiver may be utilized to supply constant power energization to the lamp irrespective of changes in line voltage. Since the light emitted from the lamp 29 is relatively constant throughout the life of the lamp, a high quality color reference unit is provided. However, it will be understood that a less expensive light source, such as a conventional incandescent lamp, which is connected in the receiver supply line, may be employed. Although the light intensity emitted by such a lamp fluctuates with changes in line voltage and gradually decreases during the life of the lamp, a color reference source having the desired relative saturation levels is nevertheless effected. Therefore, with this latter type of illumination source, the chroma adjustment is made so as to provide that degree of color saturation which is most desirable to those receiving the reproduced image.

Referring to Figs. 3 and 4, there is shown another embodiment of the present invention wherein a single reference color source is provided for use in adjusting a color television receiver. In this embodiment, the color source is incorporated into the channel selector switch of the receiver, this switch being of the type which has an illuminated indicator drum for identifying the particular channel to which the receiver is tuned. The combination channel selector and color reference unit comprises a shaft 30 which is connected to a standard tuner (not shown) for selection of the desired television channel. A drum 32, having an inner annular flange 34 which is press fitted on the shaft 30, is provided with a plurality of numerals on the outer surface of the rearwardly directed portion 36 thereof. These numerals are spaced at equal intervals about the drum and represent the respective channels to which the receiver may be tuned. In order to provide a window for viewing of the drum portion 36, an aperture 38 is provided in a cup-shaped cover member 40 which extends forwardly from the front of the receiver cabinet 42 through a circular aperture 44 therein. An outwardly directed annular flange 43 is provided at the open end of the cover 40 for attachment to the receiver cabinet. The cover 40 is further provided with a central aperture 46 which is defined by a forwardly extending annular flange 48 which loosely surrounds the forward end of shaft 30. A knob 50 is attached to the end of the shaft 30 by any suitable means. A light source 52 is supported from a bracket 54 which extends forwardly from the receiver chassis (not shown) and is energized from a suitable power source through a pair of conductors 56 and 58 which are attached thereto. A filter 60 is arranged in the aperture 38 in the cover member 40 and has a light transmission characteristic such as to pass one of the colors transmitted and reproduced on the image screen.

It will thus be seen that when the television receiver is energized so that current is supplied to the lamp 52 over the conductors 56 and 58, a reference color is provided through the filter 60 to permit color calibration of the color television receiver in the manner described above in connection with the unit of Fig. 2.

It will be appreciated that while the embodiment of the present invention as illustrated in Figs. 3 and 4 does not provide as much information as the embodiment of Figs. 1 and 2, it is considerably less expensive to manufacture, and provides at least one reference color to assist in adjusting the color television receiver.

The color chosen for the filter 60 could, of course, be any desired color. However, the selection of a color which is transmitted in the standard color test pattern, for example cyan, which is not very well known to the average person, may be most helpful in aligning the receiver.

While there has been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. Apparatus for use in adjusting a television receiver of the type having a viewing screen upon which the televised image is reproduced in simulation of its natural colors, comprising a source of illumination positioned within the cabinet of said receiver, a window in the front of said cabinet for emitting light from said source from said cabinet, said window being positioned below said receiving screen in relatively close proximity thereto, a plurality of filter elements contiguously arranged across said window, said elements having respective light transmission characteristics corresponding to the color bars in a standard color bar test pattern, and means for interrupting the emission of light from said window during normal viewing of the image screen of said receiver.

2. Apparatus for use in adjusting a color television receiver having a viewing screen on which a televised image is reproduced, comprising, a source of illumination disposed within the cabinet of said receiver near the viewing screen thereof, a window in said cabinet near said viewing screen, a plurality of first filters contiguously arranged across said window, a plurality of second filters contiguously arranged across said window adjacent said row of first filters, said first filters being adapted to coact with said source of illumination to provide a plurality of hues simulating the respective hues in a standard color bar test pattern, said second filters being monochromatic and being adapted to coact with said source of illumination to provide respective degrees of blackness corresponding to a black and white reproduction of said standard color bar test pattern, and means for interrupting the emission of light from said filters during the normal receiving of a televised image on said screen.

3. Apparatus for use in adjusting a television receiver of the type adapted to receive and display an image in simulation of its natural colors, comprising filter means attached to the television receiver cabinet at the front thereof in close proximity to the image screen, said filter means including a plurality of filter elements having light transmission characteristics respectively corresponding to the color bars as a color bar test pattern, a plurality of monochromatic density filters having densities corresponding to those of the colors transmitted in a standard color test pattern, and means located within said receiver cabinet for illuminating said filter means.

4. A color reference source for facilitating adjustment of a color television receiver, comprising, illuminating means located within the cabinet of said receiver, filter means disposed so as to be illuminated by said illuminating means, said filter means coacting with said illuminating means to effect a light which substantially simulates at least one hue which is present in a televised color bar test pattern, means enabling a viewing of light transmitted through said filter at the front of said cabinet in close proximity to the image screen thereof, and means for interrupting the transmission of all light from said filter means to the front of said cabinet, thereby to prevent interference with normal viewing of a televised image on the screen of said receiver.

5. Apparatus for use in adjusting a television receiver of the type having a viewing screen upon which the televised image is reproduced in simulation of its natural colors, comprising, a source of illumination positioned within the cabinet of said receiver, a window in the front of said cabinet for emitting light emanating from said source from said cabinet, said window being positioned directly below said receiving screen in relatively close proximity thereto, a plurality of filter elements contiguously arranged across said window, and said elements having respective light transmission characteristics corresponding to the color bars in a standard color bar test pattern.

References Cited in the file of this patent

UNITED STATES PATENTS 2,703,340 Hoyt ---------------- Mar. 1, 1955